(12) United States Patent
Shukla et al.

(10) Patent No.: US 8,909,632 B2
(45) Date of Patent: Dec. 9, 2014

(54) SYSTEM AND METHOD FOR MAINTAINING PERSISTENT LINKS TO INFORMATION ON THE INTERNET

(75) Inventors: Saurabh Shukla, Morrisville, NC (US);
Mandar U. Jog, Raleigh, NC (US);
Shreyansh Shukla, Karnataka (IN);
Scott W. Newman, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 11/873,710

(22) Filed: Oct. 17, 2007

(65) Prior Publication Data

US 2009/0106270 A1 Apr. 23, 2009

(51) Int. Cl.
*G06F 17/30* (2006.01)

(52) U.S. Cl.
CPC .... *G06F 17/30884* (2013.01); *G06F 17/30864* (2013.01)
USPC ............ 707/726; 707/709; 707/716; 707/741

(58) Field of Classification Search
CPC ................................................ G06F 17/30884
See application file for complete search history.

(56) References Cited

U.S. PATENT DOCUMENTS

| | | | |
|---|---|---|---|
| 6,208,995 B1 * | 3/2001 | Himmel et al. ............ | 707/104.1 |
| 6,247,021 B1 | 6/2001 | Himmel et al. | |
| 2001/0044810 A1 | 11/2001 | Timmons | |
| 2002/0087573 A1 * | 7/2002 | Reuning et al. ............... | 707/102 |
| 2002/0156832 A1 | 10/2002 | Duri et al. | |
| 2003/0212790 A1 * | 11/2003 | Thambidurai et al. ........ | 709/225 |
| 2004/0030741 A1 * | 2/2004 | Wolton et al. ................. | 709/202 |
| 2004/0199497 A1 | 10/2004 | Timmons | |
| 2004/0220926 A1 * | 11/2004 | Lamkin et al. .................... | 707/3 |
| 2005/0149576 A1 | 7/2005 | Marmaros et al. | |
| 2005/0187972 A1 * | 8/2005 | Kruger et al. ............. | 707/104.1 |
| 2005/0192824 A1 * | 9/2005 | Schuetze et al. .................. | 705/1 |
| 2005/0216474 A1 * | 9/2005 | Wiener .......................... | 707/10 |
| 2005/0262089 A1 * | 11/2005 | Wu ............................... | 707/10 |

(Continued)

OTHER PUBLICATIONS

International Search Report and Written Opinion for International Application No. PCT/EP2008/063532, mailed Dec. 30, 2008.

(Continued)

*Primary Examiner* — Mohammad S Rostami
(74) *Attorney, Agent, or Firm* — Terrile, Cannatti, Chambers & Holland, LLP; Stephen A. Terrile

(57) ABSTRACT

A method, system and computer-usable medium are disclosed for maintaining persistent links to information stored on a network. Information elements are tagged and their original network location is saved as a hyperlink. The tagged information elements are then acquired at the original network location by a search engine crawler, indexed by a search engine, and stored in an information location index. The tagged information elements are periodically submitted to the search engine to generate search results. Comparison operations are performed to determine the search results comprising the closest-matching information elements and their current network location. The network location stored in the hyperlink is replaced with the current network location if it is not the same.

20 Claims, 6 Drawing Sheets

(56) References Cited

U.S. PATENT DOCUMENTS

| | | | |
|---|---|---|---|
| 2006/0089948 A1* | 4/2006 | Picker et al. | 707/103 R |
| 2007/0073758 A1* | 3/2007 | Perry et al. | 707/102 |
| 2007/0106650 A1* | 5/2007 | Moore | 707/3 |
| 2007/0143298 A1* | 6/2007 | Surendran et al. | 707/10 |
| 2007/0185835 A1* | 8/2007 | Ursitti et al. | 707/3 |
| 2007/0185858 A1* | 8/2007 | Lu et al. | 707/5 |
| 2007/0185911 A1* | 8/2007 | Thambidurai et al. | 707/104.1 |
| 2007/0226206 A1* | 9/2007 | Pavlovski et al. | 707/5 |
| 2008/0082466 A1* | 4/2008 | Meijer et al. | 706/12 |
| 2008/0091685 A1* | 4/2008 | Garg et al. | 707/10 |
| 2008/0140679 A1* | 6/2008 | Deyo et al. | 707/100 |
| 2008/0189274 A1* | 8/2008 | Mann | 707/5 |
| 2008/0228749 A1* | 9/2008 | Brown | 707/5 |
| 2008/0301727 A1* | 12/2008 | Cristofalo et al. | 725/35 |

OTHER PUBLICATIONS

PowerBookmarks: A system for personalizable Web Information, organization, sharing and management, Computer Networks, Elsevier Science Publishers B.V. Amsterdam, NL, vol. 31, No. 11-16, May 17, 1999, pp. 1375-1389.

Kim et al., Personalized mining of web documents using link structures and fuzzy concept networks, Applied Soft Computing, Elsevier, vol. 7, No. 1, Nov. 16, 2006, pp. 398-410.

Braendli, C., et al., "Archiving Agent for the World Wide Web", IBM TDB vol. 40, No. 6, pp. 33-34 (Jun. 1997).

Senthikumar, G., et al., "Content-based retrieval using fuzzy interactive and competitive neural network", Proceedings of the SPIE, vol. 2606, abstract (Oct. 1995).

* cited by examiner

SYSTEM AND METHOD FOR MAINTAINING PERSISTENT LINKS TO INFORMATION ON THE INTERNET

BACKGROUND OF THE INVENTION

1. Field of the Invention

Embodiments of the disclosure relate in general to the field of computers and similar technologies and, in particular, to software utilized in this field. More specifically, it relates to a system, method and computer usable medium for maintaining persistent links to information stored on a network.

2. Description of the Related Art

The volume and diversity of network accessible information continues to grow. Today, it is common for vast amounts of this information to be stored on the public Internet. However, the information may also be stored on a local area network (LAN), a wide area network (WAN), or a private intranet. Regardless of where it might be stored, locating the information that is needed, when it is needed, is an ongoing challenge for today's information user. In response, a number of current approaches to this issue implement software applications, generally known as "crawlers," that systematically access and index information so that it can be subsequently retrieved. For example, if the information is stored in a Web page, its address or uniform resource locater (URL), metadata, and other search criteria within the page are processed by the crawler and added to a searchable index. The resulting indexed information can then be searched by a search engine using search criteria submitted by the user. Once users find the information they are looking for the location of the found information is typically stored as a bookmark in a browser application. Some browsers allow the user to annotate the location information to facilitate relocation of the information by the user at a later time.

Keeping track of migrated information presents significant challenges. Network-accessible information is often dynamic and it is not unusual for it to be revised, combined, reformatted, or moved. For example, there are times when information remains generally within a network domain location, but is moved to a different Web page. In other cases, the information is moved to a different Web site, a different server, or even a significantly different network address. It is even possible that some or all of the information may be deleted from its original location, resulting in a dead link. To address this issue, information site administrators will sometimes implement links at the original location that will redirect the user to a new location. However, this approach becomes impractical if the information is changed or moved on a frequent basis, as the information site could quickly become cluttered with redirection links.

Current solutions to this issue include having the crawler application re-index information sites on a periodic basis, with some information sites being re-indexed more frequently than others. Assuming the information has not been significantly changed or deleted, its new location can then be found by a user resubmitting their original search criteria, even if the original bookmark is no longer valid. These approaches presume that the information has been re-indexed since the searched-for information was last altered or moved. They also presume that the user is able to resubmit the original search criteria. If either or both of these presumptions is not true, it may be difficult, if not impossible, to relocate information that was previously located and bookmarked. As a result, users currently are unable to maintain persistent links to network-accessible information as its content is modified or its location is changed.

BRIEF SUMMARY OF THE INVENTION

The present invention includes a method, system and computer-usable medium for maintaining persistent links to information stored on a network. In various embodiments of the invention, a persistent information linking (PIL) system is implemented for a user to tag information elements of interest within a browser. These information elements can include but are not limited to, sections of text content, key words, pre-formatted search engine queries, hashed information elements, and binary objects such as graphic images. In one embodiment, the PIL system automatically tags the original network location of tagged information elements, such as the Internet protocol (IP) address and uniform resource identifier (URI). In other embodiments, the PIL system may also automatically tag information elements that comprise operating system (OS) information, hosting software information, and geographical locations.

Once the information elements are tagged, the original network address is saved as a hyperlink. In one embodiment, the saved hyperlink is stored as a bookmark. The tagged information elements are then acquired at the original network address by a search engine crawler. Once acquired, the tagged information elements are indexed by, a search engine and stored in a search engine information address index. The tagged information elements are then periodically submitted to the search engine by the PIL system.

Submission of the tagged information elements generates search results. Comparison operations are then performed between the search results and the previously-tagged information elements to determine the link to the closest-matching information elements. In one embodiment, fuzzy logic operations are performed to determine the closest match. Additional processing operations are then performed to determine whether the closest-matching information elements are linked to the same network address as the original network address of the tagged information elements. If they are not, the original network address saved as the hyperlink is replaced with the current network address of the closest-matching information elements and the process is repeated at predetermined intervals thereafter. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
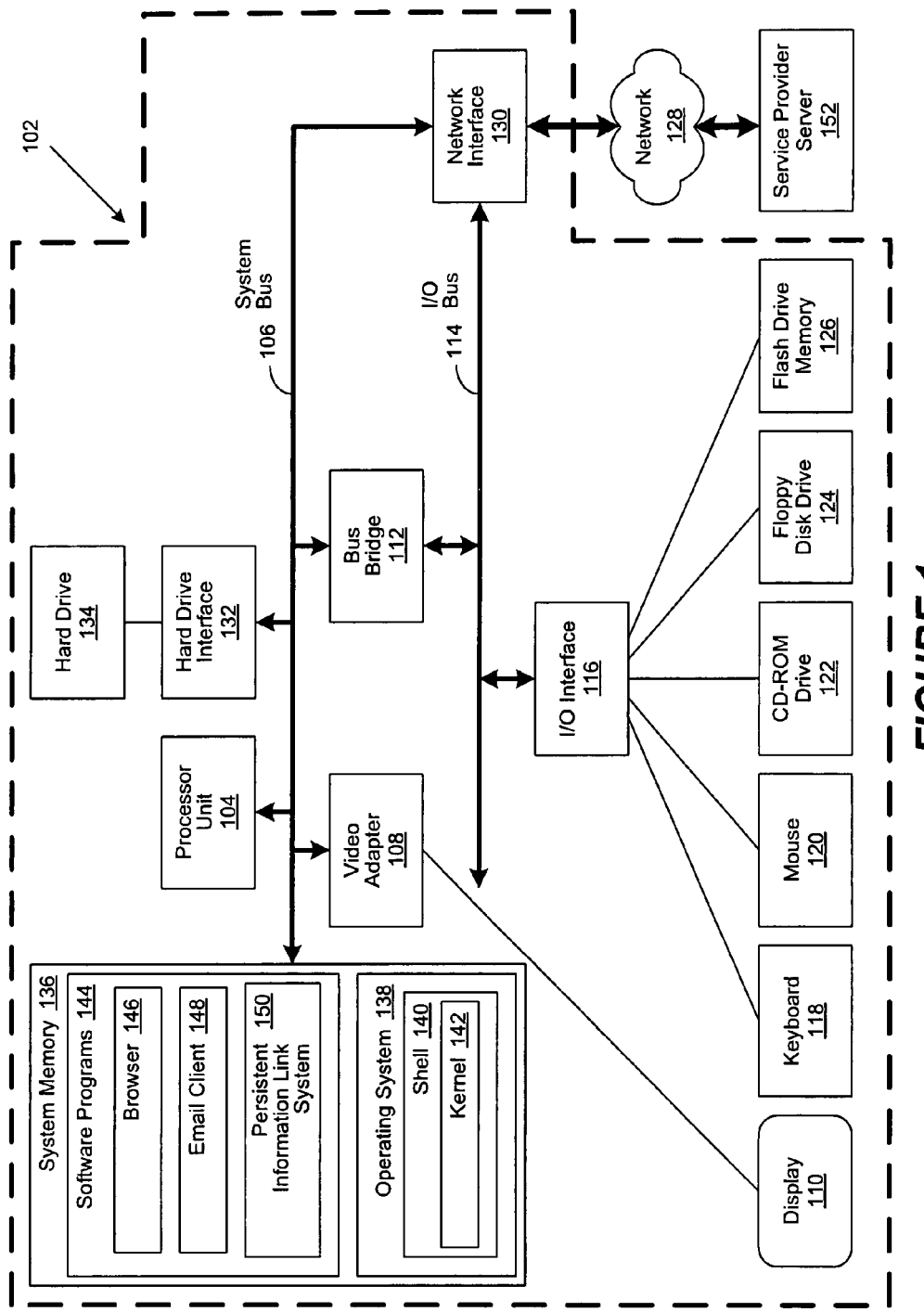
FIG. 1 depicts an exemplary client computer in which the present invention may be implemented.

A method, system and computer-usable medium are disclosed for maintaining persistent links to information stored on a network. As will be appreciated by one skilled in the art, the present invention may be embodied as a method, system, or computer program product. Accordingly embodiments of the invention may be implemented entirely all hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk C++ or the like. However, the computer program code for carrying out operations or the present invention may also be written in conventional procedural programming languages, such as the "C" programming language or similar programming languages. The program code may execute entirely on the users computer, partly on the users computer, as a stand-alone software package, partly on the user's computer and partly on a remote computer, or entirely on the remote computer or server. In the latter scenario, the remote computer mal be connected to the user's computer through a local area network (LAN) or a wide area network (WAN), or the connection may be made to an external computer (For example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122: a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a persistent information link system 150. Persistent information link system 150 includes code for implementing the processes described in FIGS. 2 through 6 described hereinbelowv. In one embodiment client computer 102 is able to download persistent information link system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope or the present invention.

Figure 2:
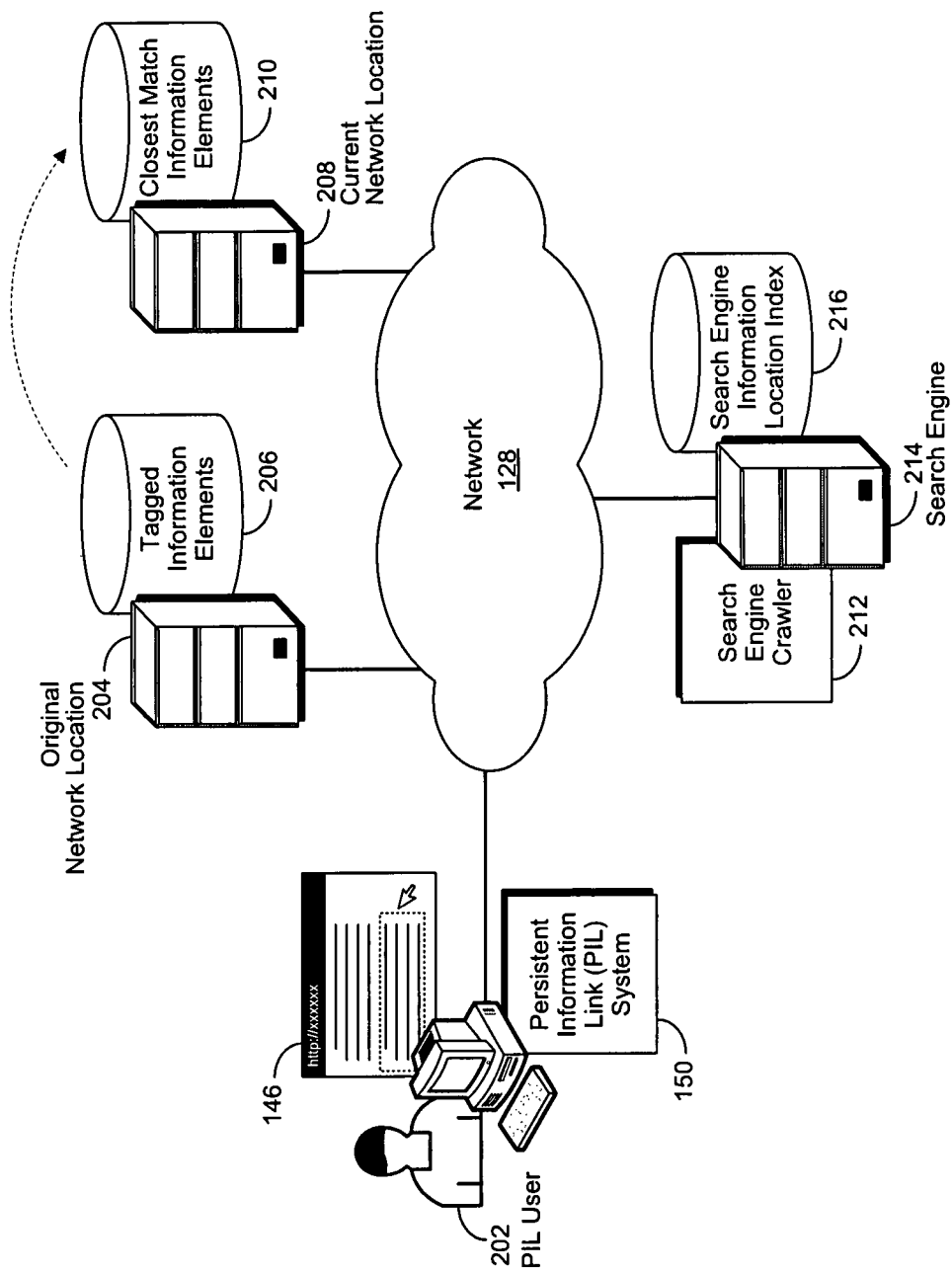
FIG. 2 is a simplified block diagram of a persistent information link (PIL) system as implemented in accordance with a first embodiment of the invention.

FIG. 2 is a simplified block diagram of a persistent information link (PIL) system 150 as implemented in accordance with an embodiment of the invention. In this embodiment, tagged information elements 206 are moved from a server at an original network location 204 to a server at a current network location 208. Persistent linking of information elements begins with a PIL user 202 selecting information elements of interest to be tagged within browser 146. These information elements can include, but are not limited to, sections of text content, key, words, pre-formatted search engine queries, hashed information elements, and binary objects such as graphic images.

In one embodiment, PIL system 150 automatically lags information about the original network location 204 of tagged information elements 206 such as its Internet protocol (IP) address and uniform resource identifier (URI). In other embodiments, the PIL system 150 may also automatically tag information elements that comprise operating system (OS) information, hosting software information, and geographical locations. Once the information elements are tagged 206, the original network location information 204 is saved as a hyperlink. In one embodiment, the saved hyperlink is stored as a bookmark in browses 146. In another embodiment, the bookmark is annotated. For example, a PIL, system user 202 may realize that the tagged information elements 206 may be modified if they are moved to a different network location. If so, they may not be immediately recognizable and annotation can assist the PIL system user 202 in remembering the purpose of establishing the persistent link. The tagged information elements 206 are then acquired at the original network location 204 by a search engine crawler 212. Once acquired, the tagged information elements 206 are indexed by a search engine 214 and stored in the search engine information location index 216.

The tagged information elements 206 are then periodically submitted to the search engine 214 by the PIL system 150. The submission of the tagged information elements generates search results. Comparison operations are then performed to determine the search results comprising the closest-matching information elements 210 and their current network location 208. In one embodiment, fuzzy logic operations familiar to those of skill in the art are performed to determine the closest match. Additional processing, operations are then performed to determine whether the closest-matching information elements 210 are linked to the same network location as the original network location 204 of the tagged information elements 206. If they are, then the process is repeated at predetermined intervals. If not, the original network location 204 saved as the hyperlink is replaced with the current network location 208 of the closest-matching information elements 210 and the process is repealed at predetermined intervals thereafter.

Figure 3:
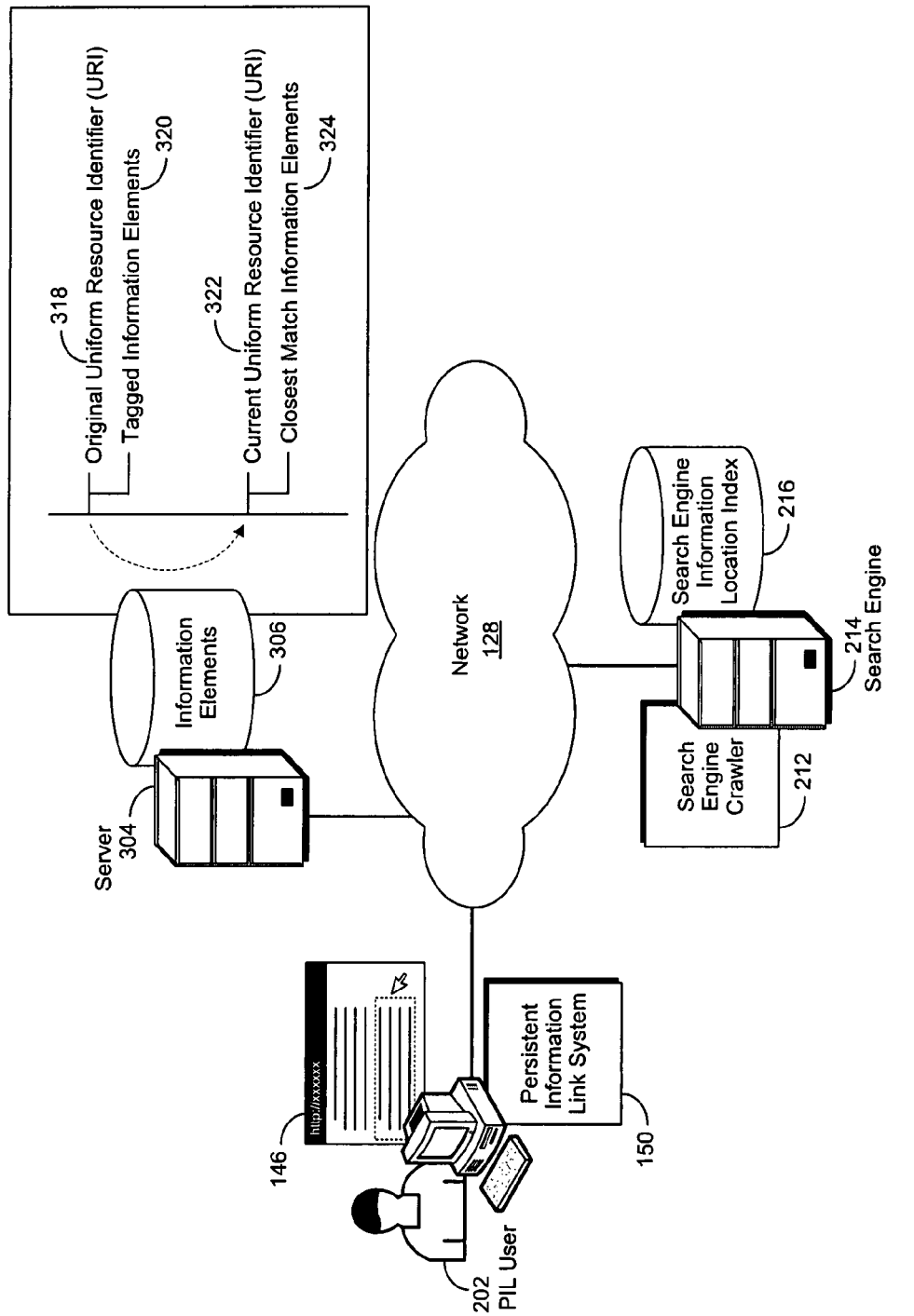
FIG. 3 is a simplified block diagram of a PIL system as implemented in accordance with a second embodiment of the invention.

FIG. 3 is a simplified block diagram of a persistent information link (PIL) system as implemented in accordance with a second embodiment of the invention. In this embodiment, tagged information elements 320 are moved from an original network location, such as a Uniform Resource Identifier (URI) 320, on sender 304 to a current URI 322. Persistent linking of information elements begins with a PIL user 202 selecting information elements 306 of interest to be tagged within browser 146. These information elements 306 can include, but are not limited to, sections of text content, key words, pre-formatted search engine queries, hashed information elements, and binary objects such as graphic images.

In one embodiment, PIL system 150 automatically tags information about the original network location of tagged information elements 206 such as the Internet protocol (IP) address of server 304 and their original uniform resource identifier (URI) 318. In other embodiments, the PIL system 150 may also automatically tag information elements that comprise operating system (OS) information, hosting software information, and geographical locations. Once the information elements are tagged 320, their associated original network location information, such as the Internet protocol (OP) address of server 304 and their original uniform resource identifier (URI) 318, is saved as a hyperlink. In one embodiment, the saved hyperlink is stored as a bookmark in browser 146. In another embodiment; the bookmark is annotated. The tagged information elements 318 are then acquired at the IP address of server 304 and their original URI 318 by a search engine crawler 212. Once acquired, the tagged information elements 320 are indexed by a search engine 214 and stored in the search engine information location index 216.

The tagged information elements 320 are then periodically submitted to the search engine 214 by the PIL system 150. The submission of the tagged information elements generates search results. Comparison operations are then performed to determine the search results comprising the closest-matching information elements 324 and their current URI 322. In one embodiment, fuzzy logic operations familiar to those of skill in the art are performed to determine the closest match. Additional processing operations are then performed to determine whether the closest-matching information elements 324 are linked to the same network location as the IP address of server 304 and original URI 318 of the tagged information elements 320. If they are, then the process is repeated at predetermined intervals. If not, the original URI 318 saved as the hyperlink is replaced with the current URI 322 of the closest-matching information elements 324 and the process is repeated at predetermined intervals thereafter.

Figure 4:
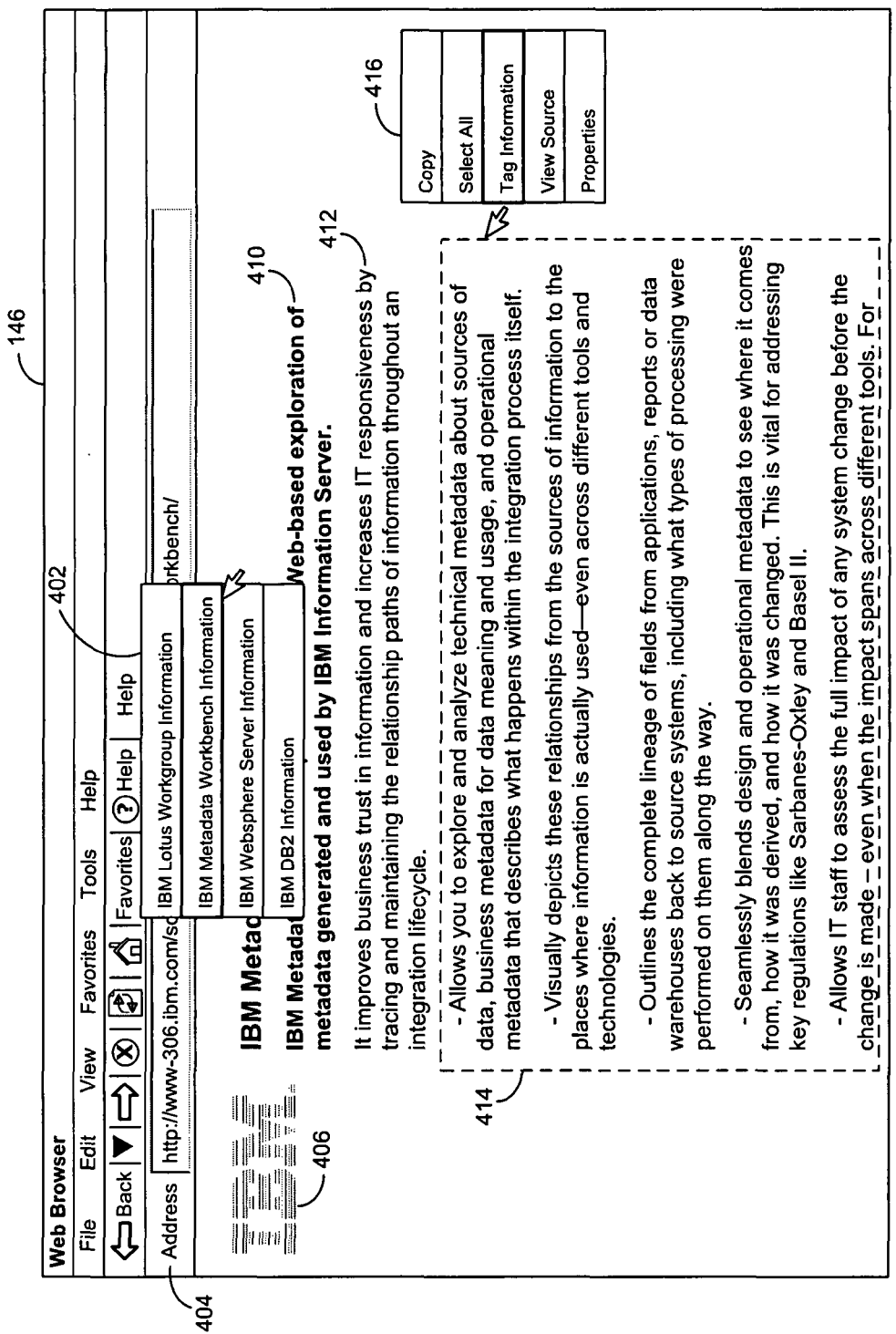
FIG. 4 is a simplified illustration of a PIL system user interface as implemented to tag information elements in accordance with an embodiment of the invention.

FIG. 4 is a simplified illustration of a persistent information link (PIL) system user interface as implemented to tag information elements in accordance with an embodiment of the invention. In this embodiment, a PIL user selects information elements of interest 406, 408, 410, 412 and 414, to be tagged within browser 146. These information elements can include, but are not limited to sections of text content 408, 410, 412,

414, keywords, pre-formatted search engine queries, hashed information elements, and binary objects such as graphic images 406. In one embodiment, information element 414 is selected through a user gesture such as a mouse click and drag operation and a PIL window 416 is opened through a similar user gesture such as a mouse right-click. The user then selects the associated menu item within PIL window 416 to tag information element 414.

In one embodiment, the PIL system automatically tags information about the original network location of tagged information elements 406, 408, 410, 412, and 414, such as their original uniform resource identifier (URI) 404. In other embodiments, the PIL system may also automatically tag information elements that comprise operating system (OS) information, hosting software information, and geographical locations. Once the information elements are tagged, their associated original network location information, such as their original uniform resource identifier (URI) 404, is saved as a hyperlink. In one embodiment, the saved hyperlink is stored as a bookmark 402 in browser 146. In another embodiment, the bookmark 402 is annotated. The tagged information elements 406, 408, 410, 412, and 414, are then acquired at their original URI 404 by a search engine crawler. Once acquired, the tagged information elements 406, 408, 41, 412, and 414, are indexed by a search engine and stored in the search engine information location index.

Figure 5:
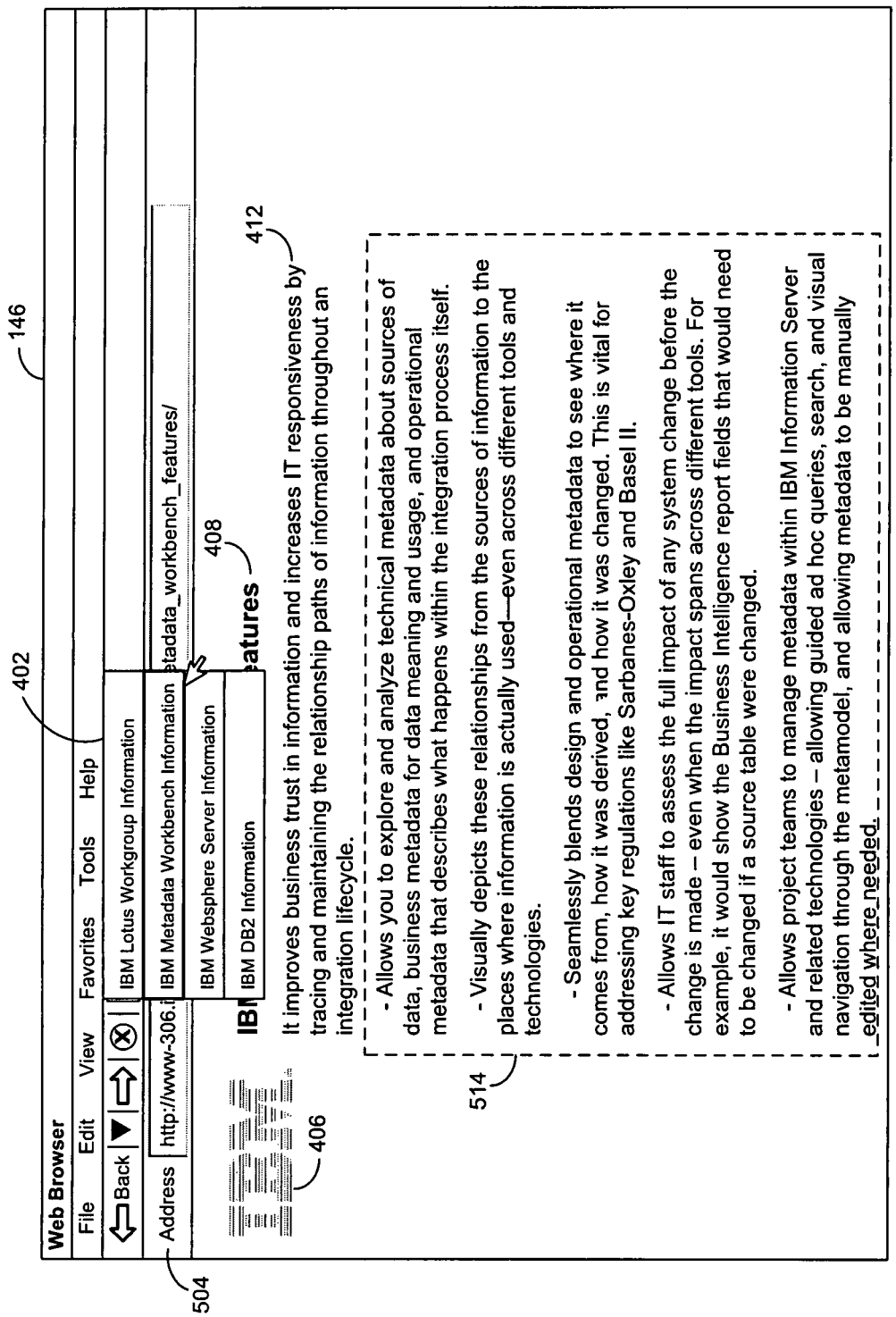
FIG. 5 is a simplified illustration of a PIL system user interface as implemented to display information elements that have been persistently linked in accordance with an embodiment of the invention.

FIG. 5 is a simplified illustration of a PIL system user interface as implemented to display information elements that have been persistently linked in accordance with an embodiment of the invention. In this embodiment, the tagged information elements 406, 408, 410, 412 and 414, described in FIG. 3 are periodically submitted to a search engine by the PIL system. The submission of the tagged information elements generates search results. Comparison operations are then performed between the search results and the previously-tagged information elements to determine the URI link to the closest-matching information elements. In one embodiment, fuzzy logic operations familiar to those of skill in the art are performed to determine the closest match. Additional processing operations are then performed to determine whether the closest-matching information elements are linked to the original URI 404 of the tagged information elements 406, 408, 410, 412, and 414. If then are, then the process is repeated at predetermined intervals. If not the original URI 318 saved as the hyperlink is replaced with the current URI 322 of the closest-matching information elements 324 and the process is repeated at predetermined intervals thereafter.

To view the persistently-linked information, the PIL system user selects bookmark 402. By selecting the bookmark 402 through a user gesture such as a mouse click, the current URI 504 of the closest-matching information elements is entered and the contents of the URI are displayed. In this embodiment, originally-tagged information elements 406, 408, and 412 are displayed, but tagged information element 410 is not. Furthermore, a subset of content information elements 414 are now displayed as content information elements 514.

Figure 6:
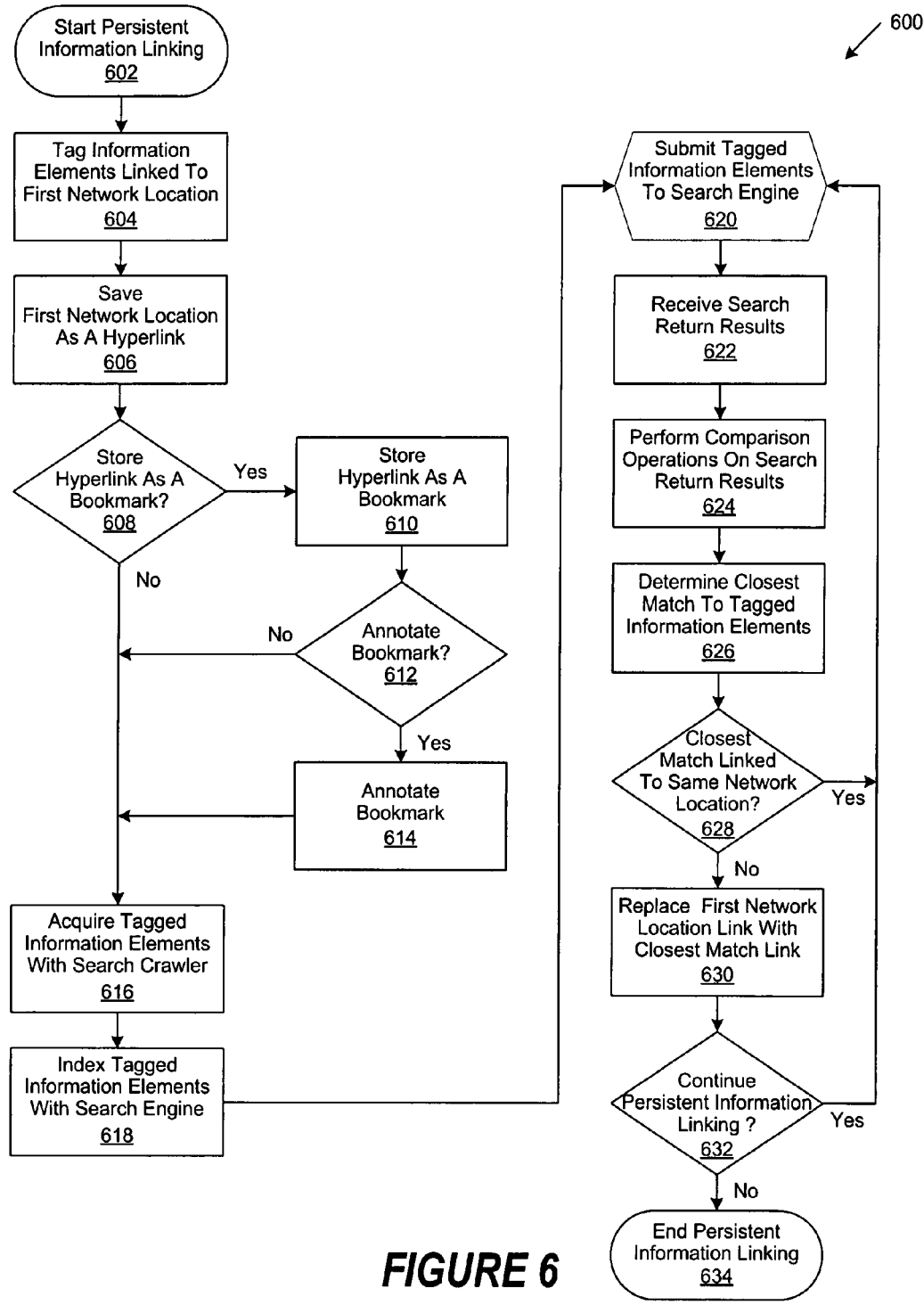
FIG. 6 is a generalized flowchart 600 illustrating the implementation of a PIL system in accordance with an embodiment of the invention.

FIG. 6 is a generalized flowchart 600 illustrating the implementation of a persistent information link (PIL) system in accordance with an embodiment of the invention. In various embodiments, persistent information linking operations begin with step 602 by tagging information elements linked to a first network location in step 602. In these embodiments, tagged information elements comprise the network location of the information elements, such as an Internet protocol (IP) address and a uniform resource identifier (URI). Tagged information elements may also comprise operating system (OS) information, hosting software information, and geographical locations. Tagged information elements further include sections of content, key words, pre-formatted search engine queries, hashed information elements, and binary objects such as graphic images.

Once information elements are tagged in step 604, the network location the are linked to is saved as a hyperlink in step 606. A determination is then made in step 608 whether the saved hyperlink is to be stored as a bookmark. If so, the hyperlink is stored as a bookmark in step 610. A determination is then made in step 612 whether the bookmark is to be annotated in step 612. If so, the bookmark is annotated in step 614. For example, a PIL system user may realize that the tagged information elements may be modified or moved to a different network location in the future and needs a reminder of why the persistent link was originally needed. However, if the determination made in step 608 is to not store the saved hyperlink as a bookmark, then the tagged information elements are acquired by a search engine crawler in step 616. Once acquired, the tagged information elements are indexed by a search engine in step 618.

The tagged information elements are then periodically submitted to the search engine in step 620. The submission generates search results in step 622, which are then compared to the tagged information elements in step 624. The closest match between the search results and the tagged information elements is then determined in step 626. In one embodiment, fuzzy logic operations familiar to those of skill in the art are performed to determine the closest match. A determination is then made in step 628 whether the closest-matching information elements are linked to the same network location as the original network location of the tagged information elements. If they are, then the process continues, beginning with step 620. Otherwise, the network location saved as the hyperlink is replaced with the network location of the closest-matching information elements in step 630. A determination is then made in step 632 whether to continue persistent linking of tagged information elements. If the determination in step 632 is to continue persistent linking of tagged information elements, then the process continues, beginning with step 620. Otherwise, persistent linking of tagged information elements is ended in step 634.

The flowchart and block diagrams in the figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may, sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include an structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for maintaining persistent links to information stored on a network, comprising:
    tagging a first set of information elements corresponding to a first network location to generate a set of tagged information elements;
    associating said first network location with a hyperlink;
    acquiring said set of tagged information elements at said first network location, said acquiring performed by a search engine crawler;
    indexing said set of tagged information elements with a search engine crawler, said set of tagged information elements indexed to said first network location;
    using said search engine to periodically perform a search using said set of tagged information elements to generate a plurality of individual search results, wherein each individual search result comprises a second set of information elements corresponding to a second network location;
    processing said plurality of individual search results to obtain an individual search result comprising a second set of information elements matching said set of tagged information elements;
    performing comparison operations to determine whether said second network location associated with said obtained individual search result is the same as said first network location, the comparison operations comprising performing fuzzy logic operations to determine a closest match; and
    associating said hyperlink with said second network location if said second network location is different from said first network location to provide a persistent link to said tagged information elements.

2. The method of claim 1, wherein said set of tagged information elements is provided to said search engine by a search engine crawler.

3. The method of claim 1, wherein said plurality of individual search results are processed using fuzzy logic operations.

4. The method of claim 1, wherein said hyperlink is used as a bookmark.

5. The method of claim 1, wherein said plurality of tagged information elements comprises key words.

6. The method of claim 1, wherein said hyperlink comprises a uniform resource identifier.

7. A system comprising:
    a processor;
    a data bus coupled to the processor; and
    a computer-readable medium embodying computer program code, the computer-readable medium being coupled to the data bus, the computer program code maintaining persistent links to information stored on a network and comprising instructions executable by the processor and configured for:
        tagging a first set of information elements corresponding to a first network location to generate a set of tagged information elements;
        associating said first network location with a hyperlink;
        acquiring said set of tagged information elements at said first network location, said acquiring performed by a search engine crawler;
        indexing said set of tagged information elements with a search engine crawler, said set of tagged information elements indexed to said first network location;
        using said search engine to periodically perform a search using said set of tagged information elements to generate a plurality of individual search results, wherein each individual search result comprises a second set of information elements corresponding to a second network location;
        processing said plurality of individual search results to obtain an individual search result comprising a second set of information elements matching said set of tagged information elements;
        performing comparison operations to determine whether said second network location associated with said obtained individual search result is the same as said first network location, the comparison operations comprising performing fuzzy logic operations to determine a closest match; and
        associating said hyperlink with said second network location if said second network location is different from said first network location to provide a persistent link to said tagged information elements.

8. The system of claim 7, wherein said set of tagged information elements is provided to said search engine by a search engine crawler.

9. The system of claim 7, wherein said plurality of individual search results are processed using fuzzy logic operations.

10. The system of claim 7, wherein said hyperlink is used as a bookmark.

11. The system of claim 7, wherein said plurality of tagged information elements comprises key words.

12. The system of claim 7, wherein said hyperlink comprises a uniform resource identifier.

13. A computer-readable medium embodying computer program code, the computer program code comprising computer executable instructions configured for:
    tagging a first set of information elements corresponding to a first network location to generate a set of tagged information elements;
    associating said first network location with a hyperlink;
    acquiring said set of tagged information elements at said first network location, said acquiring performed by a search engine crawler;

indexing said set of tagged information elements with a search engine crawler, said set of tagged information elements indexed to said first network location;

using said search engine to periodically perform a search using said set of tagged information elements to generate a plurality of individual search results, wherein each individual search result comprises a second set of information elements corresponding to a second network location;

processing said plurality of individual search results to obtain an individual search result comprising a second set of information elements matching said set of tagged information elements;

performing comparison operations to determine whether said second network location associated with said obtained individual search result is the same as said first network location, the comparison operations comprising performing fuzzy logic operations to determine a closest match; and associating said hyperlink with said second network location if said second network location is different from said first network location to provide a persistent link to said tagged information elements.

14. The computer-readable medium of claim 13, wherein said set of tagged information elements is provided to said search engine by a search engine crawler.

15. The computer-readable medium of claim 13, wherein said plurality of individual search results are processed using fuzzy logic operations.

16. The computer-readable medium of claim 13, wherein said hyperlink is used as a bookmark.

17. The computer-readable medium of claim 13, wherein said plurality of tagged information elements comprises key words.

18. The computer-readable medium of claim 13, wherein said hyperlink comprises a uniform resource identifier.

19. The computer-readable medium of claim 13, wherein the computer executable instructions are deployable to a client computer from a server at a remote location.

20. The computer-readable medium of claim 13, wherein the computer executable instructions are provided by a service provider to a customer on an on-demand basis.

* * * * *